United States Patent [19]

Hathorn et al.

[11] 4,265,001
[45] May 5, 1981

[54] OPENING METHOD FOR POULTRY CARCASSES

[75] Inventors: Jack L. Hathorn, Springdale, Ark.; Donald J. Scheier, Kansas City, Mo.

[73] Assignee: Gordon Johnson Company, Kansas City, Mo.

[21] Appl. No.: 908,379

[22] Filed: May 22, 1978

[51] Int. Cl.³ .............................................. A22C 21/06
[52] U.S. Cl. ....................................................... 17/11
[58] Field of Search ...................................... 17/11, 52

[56] References Cited

U.S. PATENT DOCUMENTS

| | | | |
|---|---|---|---|
| 3,744,087 | 7/1973 | Vertigaal | 17/11 |
| 3,927,440 | 12/1975 | Sindler et al. | 17/52 |
| 4,087,886 | 5/1978 | Aubert | 17/52 |
| 4,117,570 | 10/1978 | Meyn | 17/11 |
| 4,131,973 | 2/1979 | Verbakel | 17/11 X |

*Primary Examiner*—Willie G. Abercrombie
*Attorney, Agent, or Firm*—Schmidt, Johnson, Hovey & Williams

[57] ABSTRACT

A bird is gripped by its thighs adjacent the vent hole and is shifted toward a knife until the hole has reached a predetermined location that corresponds to a certain depth of insertion of the knife into the hole. Since location of the hole is being used as the determining factor with respect to depth of knife insertion, the knife always enters to the same extent regardless of the length of the bird. Operation of the knife once fully inserted causes the skin to be slit between the hole and the keel bone, thus making an enlarged opening to the body cavity.

5 Claims, 12 Drawing Figures

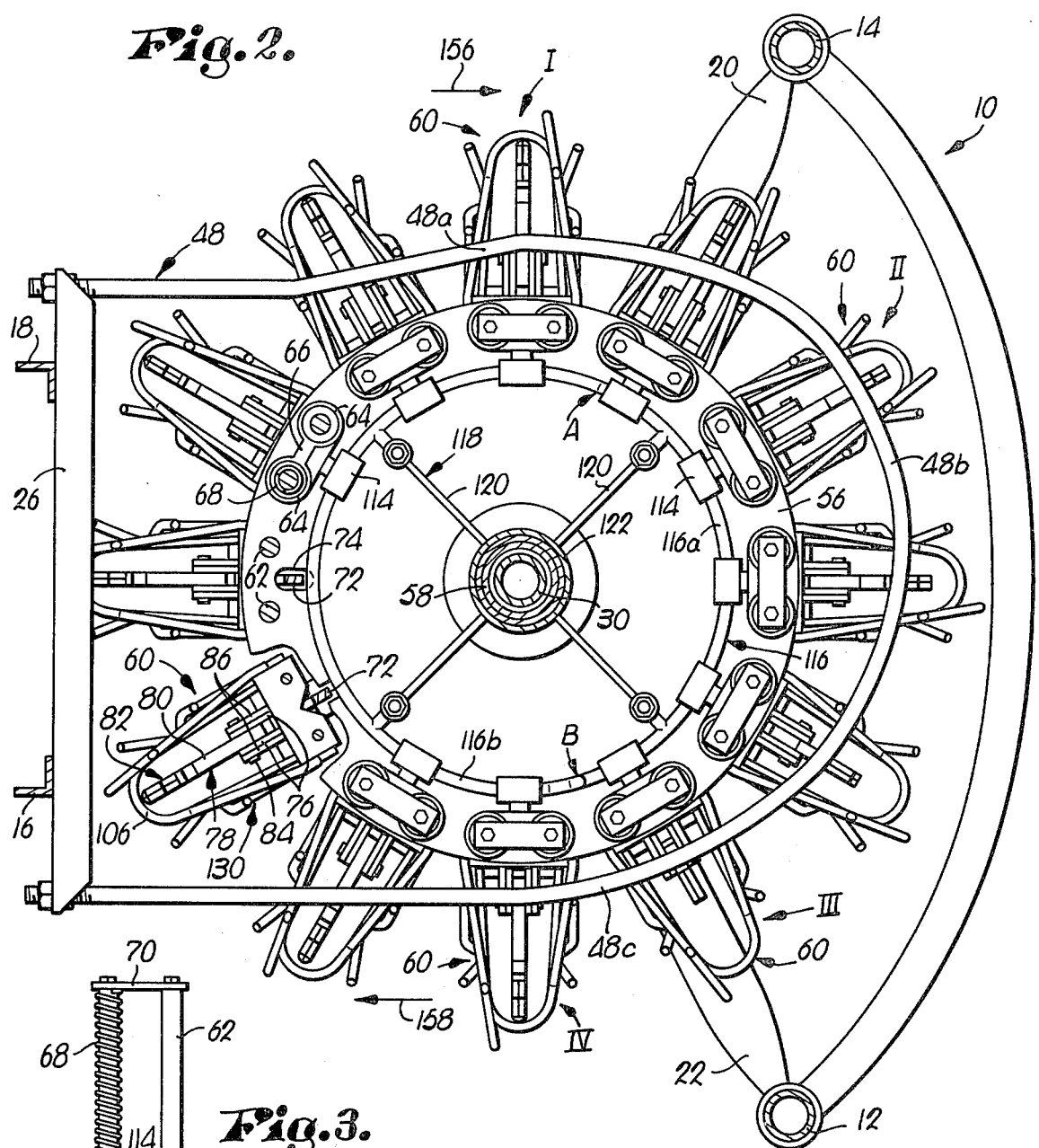

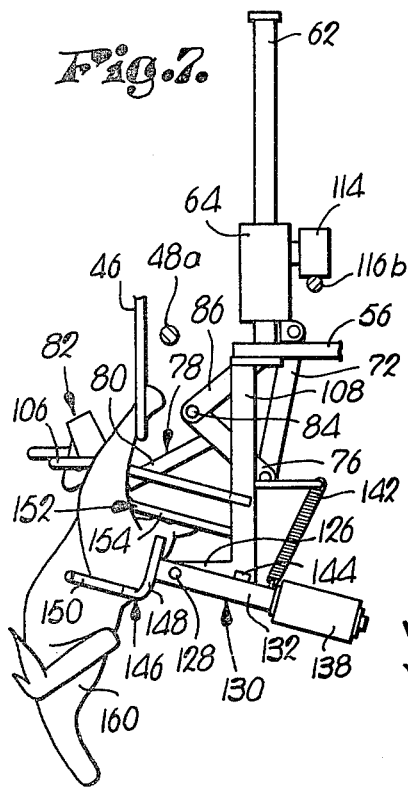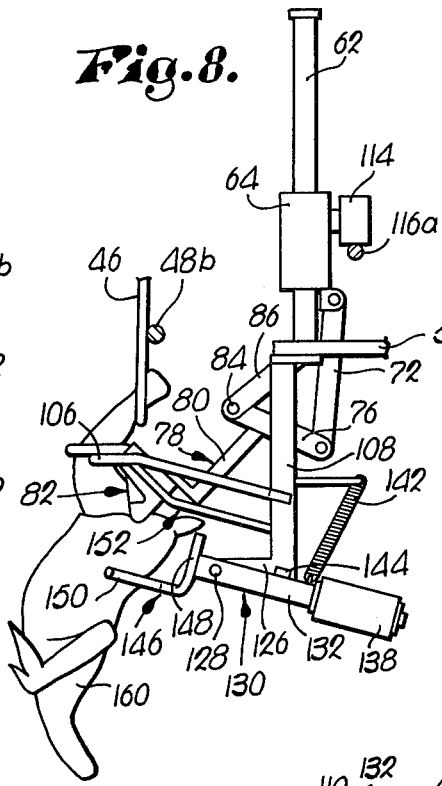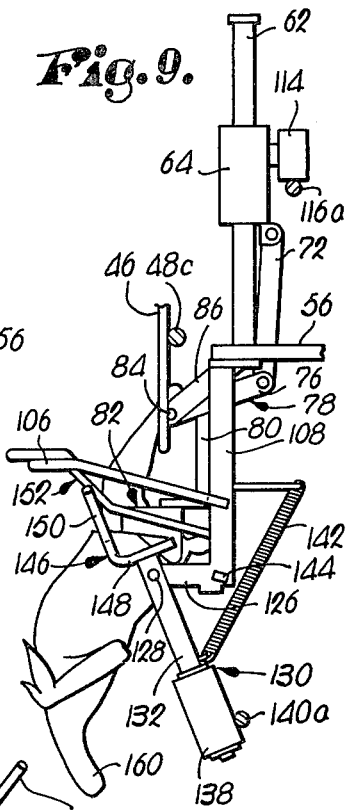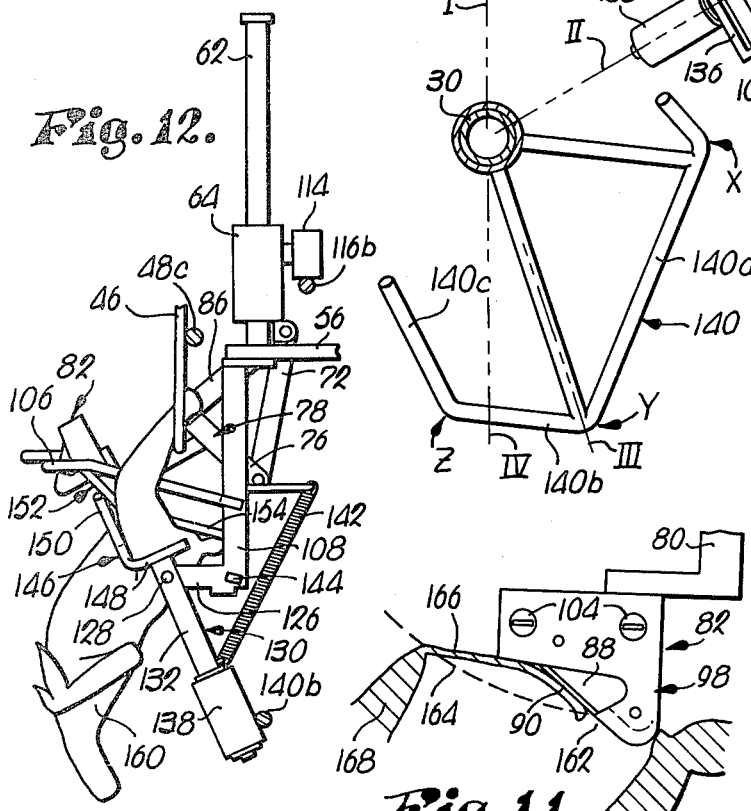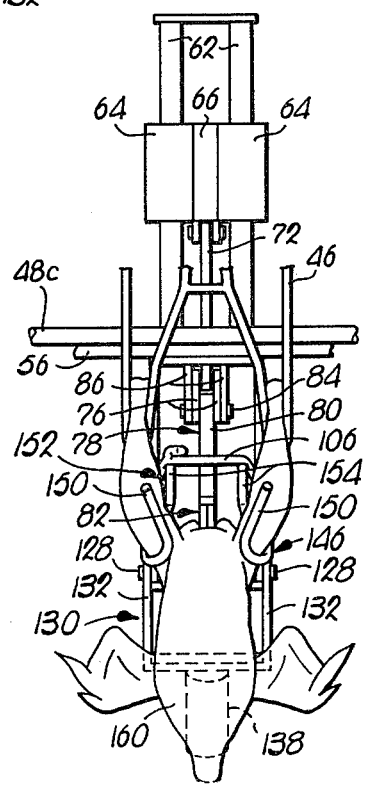

OPENING METHOD FOR POULTRY CARCASSES

TECHNICAL FIELD

This invention relates to the preparation of poultry carcasses for human consumption and, more particularly, relates to that stage of the process following the initial cut around the vent of a bird for the purpose of removing the latter and leaving an entry hole to the body cavity.

BACKGROUND ART

It is desirable to make the dimensions of the initial cut around the vent of the bird as small as possible so that the "plug" of material removed contains only a minimal amount of edible meat. On the other hand, it is necessary to thereafter enlarge this entryway into the cavity because its dimensions are too small to permit the entry of a tool for removing the viscera within the cavity. Consequently, it has long been the practice to manually slit the skin between the vent hole and the keel bone of the bird so as to provide an opening of the requisite dimensions without sacrificing edible portions of the bird.

Various efforts have been made to automate this enlarging or "opening" step, but none has heretofore been entirely successful for a number of reasons. Included among these is the fact that many prior opening mechanisms have simply been unduly complicated. Additionally, many have been unable to satisfactorily make the opening cut without also puncturing or otherwise unintentionally damaging the organs disposed closely beneath the skin intended to be severed. The latter type of mishap results in spewing contaminated fluids over the otherwise edible portions of the bird to the end that the entire bird may be unfit for consumption. Examples of method and apparatus to overcome these prior shortcomings are diclosed and claimed in prior copending application, titled "Method and Apparatus for Opening the Body Cavity of Poultry," Ser. No. 835,671, filed Sept. 22, 1977, in the names of Scheier, et al, and assigned to the assignee of the present invention.

While the arrangement described and claimed in the aforesaid application has indeed proven to be a significant improvement over prior opening methods and machines, it has been found that by limiting the extent to which the slitting knife can move in a certain direction corresponding to its depth of insertion into the hole of the bird, the actual depth of insertion can vary depending upon the particular length of the bird being processed. In other words, the knife in the aforesaid application is not adjustable relative to the length of each bird it encounters, and instead comes to a certain fixed position each and every operation, regardless of whether the bird is long or short. Hence, it is possible that the knife might be inserted more deeply into short birds than long ones, since both are suspended by their hocks from an overhead conveyor. Excessive depth of penetration of the knife could result in accidental puncture of the intestines and other organs containing contaminants that would spoil the meat.

It is known in the art to associate the slitting knife with a special locating carriage that does not permit operation of the knife until such time as the carriage has reached and engaged the stern of the bird, whatever its length. Once the stern has been engaged, the knife can move through its predetermined slitting movements with the assurance that the same depth of penetration will be achieved regardless of the length of the bird.

SUMMARY OF THE INVENTION

Such prior devices wherein the knife is adjusted according to the location of the stern of the bird are unsatisfactory for a number of reasons, not the least of which is complexity. Accordingly, a feature of the present invention is to provide a more simplified, yet highly reliable, arrangement which accommodates variations in bird lengths by bringing the sterns of all birds to the same fixed location that is strategically situated with respect to the knife. In other words, instead of adjusting the knife for each bird size, compensation is made by the birds while the knife position never changes in this regard. In this manner, regardless of whether the particular bird being processed is long or short, its vent hole is placed at precisely the same position with respect to the knife as those birds which have preceded the particular one being slit and those which will follow.

In many respects, the present invention is an extension of and an improvement upon the teachings of the aforesaid application to the assignee of this invention, and yet, in other important respects, the present invention is not limited to the specific features of said earlier application. In this regard, while the motion of the knife remains the same, the motion of the bird is different. In the present invention, the bird is grasped by its thighs adjacent the vent hole and is bodily moved toward the knife until the hole reaches a predetermined position. Although the distance through which the bird is shifted is constant for all birds, because they are all engaged adjacent their holes by the structure which effects their shifting, the overall lengths of the various birds is never a factor. In other words, if the birds were pulled toward the knife by their hocks for a fixed distance, then whether the legs were long or short would make a difference with respect to the final location of the holes. But since the area which must be properly located, i.e., the hole in the stern of the bird, is the same area being used by positioning structure to shift and locate the bird, variations in leg lengths are of no consequence. Much the same is true if the shoulders of the bird instead of the hocks were used to engage the positioning structure. In that event, body length would be a factor in determining where the holes would ultimately be located.

In carrying out the principles of the present invention, each bird to be processed is suspended by an overhead conveyor with the hocks of the bird captured within a suitable shackle. As the bird advances along a prescribed course of travel, it is gently swung into the station of a rotating, carrousel-type machine with its breast facing outwardly. A specially shielded knife, with its cutting edge trailing, swings downwardly and inwardly with respect to the rotating carrousel machine, and during such movement, the knife partially enters the previously formed hole at the vent of the bird. By the time such entry has been initiated, an upwardly swingable device is cammed into engagement with the outside of the thighs of the bird, and as the device continues to swing upwardly, it lifts the bird up against a pair of spaced shoulder rods centered between the legs and against the stern of the bird. The device essentially relieves the weight of the bird from the overhead conveyor at this time, and thus determines where the hole will be located, rather than the conveyor. Consequently, the knife cannot be over-inserted to damage the entrails.

While the thighs of the bird are thus clamped by the device against the locating shoulders, the knife flips outwardly to slit the skin between the hole and the keel bone, whereupon the device drops away and returns the load of the bird to the overhead conveyor.

BRIEF SUMMARY OF THE DRAWINGS

In the drawings

FIG. 2 is a cross-sectional view through the apparatus taken along line 2—2 of FIG. 1;

FIG. 3 is a front elevational view of one of the several slitting units of the apparatus;

FIG. 4 is an enlarged, fragmentary elevational view of a knife of one of the units, the protective casing for the knife being partially broken away to reveal details of construction;

FIG. 5 is an enlarged, fragmentary front elevational view thereof;

FIG. 6 is a fragmentary, top plan view of the cam track for the bird-positioning devices of the units and illustrating one of such devices in a position approaching the track;

FIGS. 7, 8 and 9 are schematic side elevational views of one of the slitting units illustrating successive steps in operation of the knife and the bird-positioning device;

FIG. 10 is a front elevational view of the unit corresponding to the condition of things in FIG. 9;

FIG. 11 is an enlarged, fragmentary, side elevational view of the knife in a position corresponding to that of FIGS. 9 and 10 with the body cavity of the bird illustrated in cross section; and FIG. 12 is a side elevational view comparable to FIGS. 7, 8 and 9, but showing the position of the knife and the shifting device immediately following the slitting stroke.

DETAILED DESCRIPTION

Figure 1:
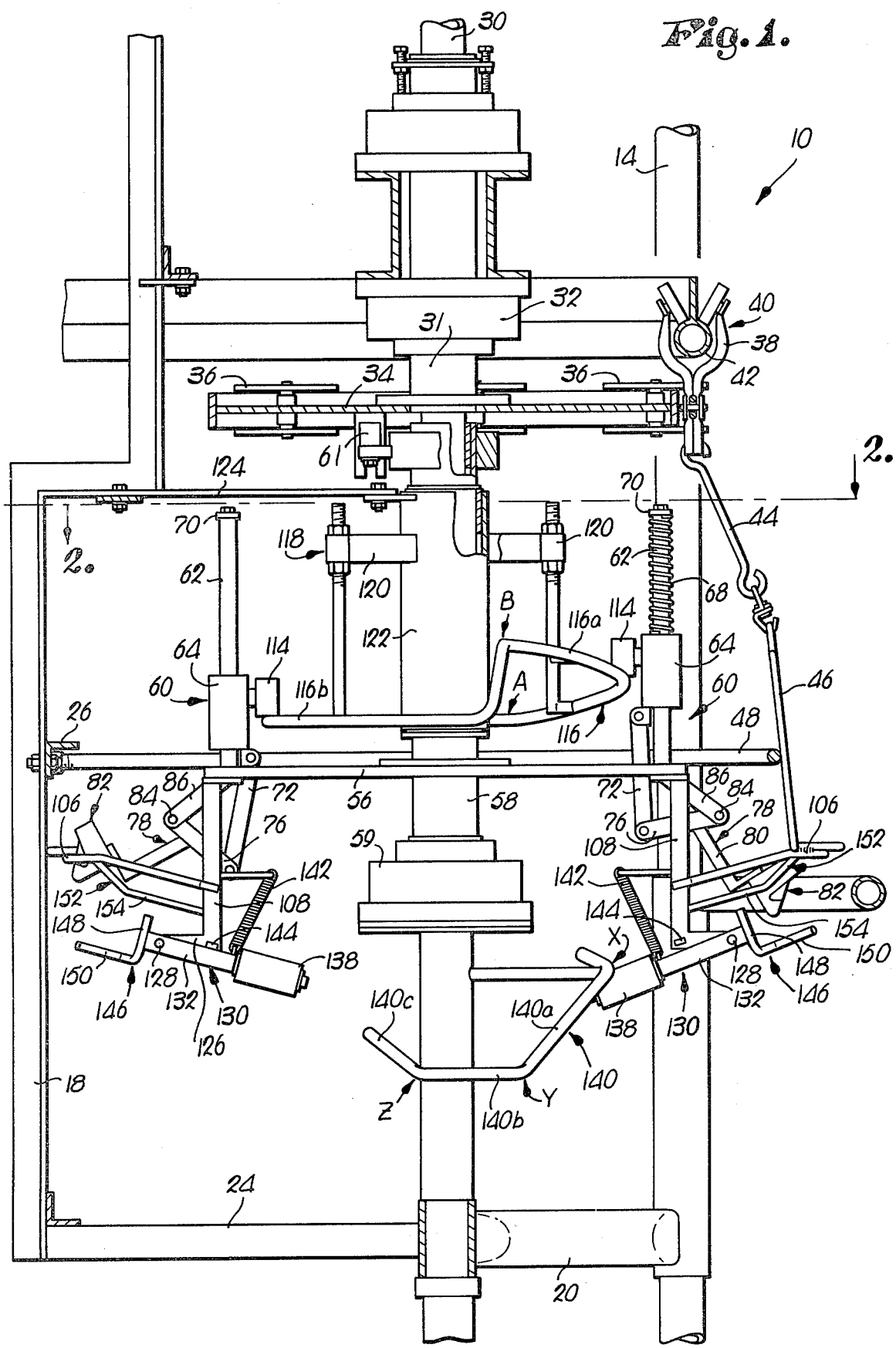
FIG. 1 is a fragmentary elevational view, partially in cross section, of apparatus constructed in accordance with the principles of the present invention and capable of carrying out our novel method.

As illustrated primarily in FIGS. 1 and 2, the apparatus includes a frame 10 consisting of, among other things, uprights 12 and 14, vertically extending angle members 16 and 18, and various horizontal braces such as 20, 22, 24 and 26, that rigidify the frame 10. In the illustrated arrangement, uprights 12 and 14 are ground-engaging while angle members 16 and 18 are not, thereby requiring that members 16 and 18 be secured to some overhead support or the like so as to stabilize the frame 10. The particular design of the frame 10, of course, has little direct bearing on the principles of the present invention.

A central upright stationary structural pipe 30 extends the full height of the frame 10 and is surrounded adjacent its upper end by a sleeve 31 that may be rotated within a bearing 32 which remains stationary with pipe 30. Sleeve 31 is then affixed to an impulse wheel 34 so that the wheel 34 and the sleeve 31 may rotate together about the upright longitudinal axis of the pipe 30. The wheel 34 is provided with a number of circumferentially spaced retaining devices 36 at its outer periphery between which are received depending trolleys 38 of a bird conveyor 40. The trolleys 38 ride along an overhead track 42 and are powered by means not illustrated so that advancement of the conveyor 40 transmits driving power to the wheel 34 through the retaining devices 36 to rotate the wheel 34 at the same peripheral speed as the lineal speed of the conveyor 40. The track 42 of the conveyor 40 encircles the machine through approximately 270 degrees thereof.

Each of the trolleys 38 carries a suspended link 44 which in turn swingably supports a shackle 46. The particular construction of shackle 46 is well-known to those skilled in the art and will not be described further herein. Suffice it to point out that a bird is suspended from the shackle 46 by its hocks in the manner illustrated, for example, in FIGS. 7, 10 and 12. A guide bar 48, disposed in a horizontal plane and looped around the machine in a generally U-shaped configuration as illustrated in FIG. 2, is formed to have various portions thereof disposed at certain selected radial distances from the axis of pipe 30 so as to engage the inner sides of the shackles 46 during their advancement and displace the same radially inwardly or outwardly as the case may be.

Substantially midway down the central axis of the apparatus, there is a plate 56 that is secured to a second lower sleeve 58 which surrounds the pipe 30 in the same manner as the upper sleeve 31. The lower sleeve 58 is supported for rotation by a lower bearing 59 that is stationary with the pipe 30 in the same manner as the upper bearing 32, and the upper end of lower sleeve 58 is connected to the underside of wheel 34 by fastening means 61 to receive driving power therefrom and thereby cause rotation of the plate 56 with the wheel 34. Twelve slitting units, each broadly denoted by the numeral 60, are circumferentially spaced about the periphery of the plate 56 for rotation with the latter, the units 60 being identical to one another in construction and operation.

Each of the units 60 includes a pair of upright posts 62 spaced apart slightly in a circumferential direction and rigidly affixed at their lower ends to the plate 56. A pair of sleeves 64, which may be tied together by a bridge 66, are slidably carried by respective ones of the posts 62 for rectilinear movement up and down the latter. One or more coil springs 68 encircling the posts 62 between the sleeves 64 and a stop 70 across the tops of the posts 62 yieldably bias the sleeves 64 downwardly toward the plate 56.

The sleeves 64 of each unit 60 are pivotally attached at their lower ends to a common link 72 that extends downwardly through an aperture 74 (FIG. 2) in the plate 56 for pivotal connection below the latter with one arm 76 of a bell crank 78. The other arm 80 of the bell crank 78 carries a knife 82, and the bell crank 78 is pivotally supported for inward and outward swinging movement about a pivot 84 by a pair of laterally spaced arms 86, depending diagonally from the plate 56 and rigidly affixed to the latter against movement relative thereto.

As illustrated in FIGS. 4 and 5, the knife 82 includes a blade 88 having a rectilinear cutting edge 90. The blade 88 has a pair of locating notches 92 at its opposite ends which receive locating pins 94 so as to position the cutting edge 90 diagonally across a notch 96 in the protective casing 98 that houses the blade 88. For the sake of convenience, the casing 98 may be constructed in two halves, comprising one half 100 that is fixed to the arm 80 and a second half 102 which may be held against the first half 100 by screws 104, thereby releasably clamping the blade 88 in place.

The arm 80 of bell crank 78 projects downwardly through a generally horizontally extending loop 106 which is rigidly attached at its inner end to a pair of depending struts 108. The struts 108 are spaced apart slightly in a circumferential direction with respect to the circular plate 56 so as to receive therebetween the arm 76 of the bell crank 78, and the struts 108 are rigidly secured to the plate 56 for rotation with the latter. A bar 110 interconnects the struts 108 across their lower ends.

Each pair of sleeves 64 carries a radially inwardly disposed common roller 114 that serves as a cam follower for a cam track 116 in the nature of a rod looped around the central axis of the apparatus. While the track 116 is circular in plan as viewed in FIG. 2 and is disposed concentrically with respect to the axis of pipe 30, it has portions thereof that rise and fall so as to control the vertical position of the sleeves 64 and hence the in-and-out position of the knife 82 of each unit 60. To this end, the track 116 includes a stretch 116a that, beginning at point A, rises gradually yet steadily for approximately 135 degrees of the track 116 until point B is reached where it suddenly drops down to a second stretch 116b which continues at the same level throughout the remaining 225 degrees. A spider 118 having a plurality of supporting legs 120 attaches the track 116 to a cylinder 122 concentrically disposed about the axis of pipe 30, but immobile relative to the latter by virtue of a connecting member 124 that joins the cylinder 122 with the frame 10.

At the lowermost ends of the struts 108, a pair of bars 126 (FIG. 6) project outwardly for a short distance above the bar 110 and in perpendicular relationship to the struts 108. The outermost ends of the bars 126 carry transverse pivots 128 by which a generally U-shaped device 130 is swingably attached to the struts 108 for up-and-down movement. The device 130 includes a pair of rigid side arms 132 that embrace the bars 126 outside of the latter and which extend a short distance rearwardly of the upright struts 108 where they are interconnected by a bight member 136. The bight member 136 carries a rearwardly extending cam follower roller 138 disposed for operating engagement with a stationary cam track 140 situated below the bearings 59, as illustrated in FIG. 1.

As shown perhaps most clearly in FIG. 6, the cam track 140, while being disposed about the central axis of the upright pipe 30, has portions thereof that rise and fall and which are disposed at varying radial distances from the axis of the pipe 30 so as to control the position of the device 130 during movement of the same with the remainder of the unit 60 during rotation about the axis of the pipe 30. In this regard, the track 140 has a portion 140a that, beginning at point X, slopes progressively downwardly and outwardly until point Y, whereupon a substantially level portion 140b takes over. The portion 140b extends slightly radially inwardly over its full length until point Z is reached, at which location portion 140c turns abruptly inwardly and upwardly for the remainder of the track 140.

FIGS. 2 and 6 view the machine in substantially the same direction so that various points along the two cam tracks 116 and 140 can be readily compared. In this regard, point A of cam track 116 begins at least 45 degrees before point X of cam track 140 when the tracks 116 and 140 are traversed in a clockwise direction. Point B of the track 116 occurs very slightly after point Y on the track 140. Thus, the upwardly inclined portion 116a of the track 116 corresponds generally with the downwardly and outwardly inclined portion 140a of the track 140, with the exception that the portion 116a starts substantially earlier than the portion 140a and terminates slightly after the termination of the portion 140a. Portions 140b and 140c of the track 140 occur during the portion 116b of the track 116.

As illustrated perhaps best in FIGS. 1, 9 and 12, the follower roller 138 is disposed for engagement with the underside of the track 140 so as to be depressed by the latter as the unit 60 moves around the axis of the pipe 30. A tension spring 142 yieldably biases the roller 138 into position for engaging the latter with the track 140 at the proper time, and also serves as a return means for the device 130 when the slitting operation has been completed. A pair of ears 144 projecting laterally outwardly from opposite ones of the struts 108 adjacent their lowermost ends serve as stops for the device 130 against the action of the spring 142 and are in position to be engaged by the arms 132 of the device 130 when the latter is swung by the spring 142 in a direction to raise the roller 138.

Each of the arms 132 has at its outer end beyond the corresponding pivot 128 a specially formed rigid bird-engaging member 146, having a pair of portions 148 and 150 that are essentially at right angles to one another, the portion 148 being perpendicular to its arm 132 and the portion 150 being substantially parallel to its arm 132. Moreover, the outer portion 150 is laterally offset from the inner portion 148 in such a direction that the two outer portions 150 of the members 146 are closer together than the two inner portions 148 thereof.

The loop 106 on the unit 60 carries locating shoulder means broadly denoted by the numeral 152, such shoulder means 152 being disposed generally in opposition to the bird-engaging members 146 of the device 130. To this end, the shoulder means 152 comprises a pair of elongated, rigid elements 154 generally below the loop 106 and having a section 154a extending substantially parallel to superimposed portions of the loop 106 and a diagonally extending portion 154b which angles upwardly until intersecting the loop 106 adjacent the outermost periphery of the latter. As illustrated perhaps best in FIG. 3, each of the elements 154 is slightly inboard of the corresponding overhead portion of the loop 106, generally in vertical alignment with the corresponding outer portion 150 of the member 146 of the device 130.

Operation

The conveyor 40 moves in a clockwise direction about the apparatus 10 as FIG. 2 is viewed, and thus drives the interconnected wheel 34 and plate 56 in the same clockwise direction through impingement of the trolleys 38 against the retaining devices 36 of the impulse wheel 34. This also results in the slitting units 60 being carried around the axis of pipe 30 in registration with respective ones of the trolleys 38. Thus, as the suspended birds approach the revolving mechanism in the direction of the arrow 156 in FIG. 2, they are successively intercepted by the units 60 and processed thereby until being released on the opposite side of the mechanism for travel in the direction illustrated by the arrow 158.

The unit 60 in position I of FIG. 2 (see also position I in FIG. 6) is substantially in the condition illustrated in FIG. 7 at this point in its revolution. Note in that figure that the cam follower 114 is riding along the low stretch 116b of cam track 116 and that therefore the knife 82 is disposed outwardly and upwardly to its furthest extent in what might be described as its operated position. The guide bar 48 has a relatively radially inwardly disposed stretch 48a at this location such that the shackle 46 is closer in to the axis of the upright pipe 30 than will be true in certain subsequent positions. The bird 160 is straddling the loop 106 at this time and, of course, the vent cut in the bird 160 has already been made, leaving a dangling plug not shown and a hole 162 which may be seen only in FIG. 11. Also at this time the follower 138 of the device 130 has not yet reached its cam track 140 (see FIG. 6) so that the device 130 is fully up against the stops 144 and is yieldably maintained in that position by the spring 142. The bird 160 has slipped between the members 146 of the device 130 and the elements 154 of the locating shoulder means 152 are overlying the stern of the bird 160 on opposite sides of the hole 162.

As the bird 160 and unit 60 progress around to point II in FIG. 2 (see also position II in FIG. 6) corresponding to the condition of things in FIG. 8, the follower 114 encounters the stretch 116a of track 116 and thus begins to raise the sleeves 64, hence swinging the knife 82 downwardly and inwardly about the pivot 84 by virtue of operating link 72 and bell crank 78. Note that during this motion the "backside" of the knife 82 leads with the cutting edge 90 trailing.

Also by this time, a second stretch 48b of guide bar 48 has been encountered by the shackle 46, such second stretch 48b being disposed radially outwardly to a greater extent than stretch 48a, and thus having the tendency to slightly swing the bird 160 outwardly. As shown in FIG. 6, the follower 138 of the device 130 has still not yet reached its cam track 140 so that the device 130 remains unactuated against the stops 144.

As the bird 160 and its slitting unit 60 travel around approximately to position III of FIG. 2 (see also position III in FIG. 6) corresponding to the condition of things in FIG. 9, the stretch 116a of cam track 116 raises the sleeves 64 to their fullest extent so as to swing the knife 82 downwardly and rearwardly to a position which may be termed its "cocked position." Thus, the swinging stroke of the knife 82 between the extreme positions of FIGS. 7 and 9 could be referred to as the cocking stroke for the knife 82.

At the same time that the knife 82 is swung downwardly and inwardly with the cutting edge 90 continuing to trail, the bird 160 is likewise swung inwardly by virtue of the fact that a third stretch 48c of the bar 48 permits this type of movement on the part of the bird 160. As the knife 82 thus backs along its path of swinging travel, the bird 160 is likewise swung inwardly toward the struts 108 in such a way that the hole 162 intersects and receives the knife 82.

During the rotation of the apparatus from position II to position III, the follower 138 of the device 130 will have engaged the track stretch 140a of cam track 140, causing the device 130 to swing in a clockwise direction viewing FIG. 9 against the bias of the spring 142, hence forcing the members 146 into engagement with the outside of the thighs of the bird 160 closely adjacent the stern and at the same level as the hole 162. Continued clockwise movement of the device 130 causes the members 146 to apply a lifting force against the thighs to such an extent that the bird 160 is actually raised up until such time as the locating shoulder elements 154 engage the stern on opposite sides of the hole 162. The thighs actually become clamped in place between the members 146 and the elements 152 to such an extent that the weight of the bird 160 is substantially relieved from the shackle 46.

Note as shown in FIG. 10 that because of the special formed nature of each member 146, while the inner portions 148 of the members 146 engage the bird 160 along the backside of the outer surface of the thighs, the outer portions 150 of the members 146 are curled around in front of the thighs to such an extent that movement of the bird 160 radially outwardly of the machine is effectively precluded. The clamping action is thus so complete that the area of the bird 160 adjacent its hole 162 is effectively immobilized in all directions. The limit of upward travel of the bird 160 is determined by the cam track 140 and, more particularly, by point Y. Thus, the distance through which the bird 160 rises toward the knife 82 is fixed, regardless of the length of the bird or the diameter of its thighs.

As a result of this special positioning of the bird 160, insertion of the knife 82 into the hole 162 is finalized to the extent illustrated in FIGS. 9, 10 and 11. In other words, while the knife 82 can swing no farther downwardly than the cocked position of FIG. 9 as a result of the length of the arm 80 and the location of the pivot 84, the final depth of insertion of the knife 82 is not determined until the bird 160 has been lifted and clamped upwardly against the locating elements 154. By having the lifting device 130 engage the bird 160 at the same level as its hole 162 and by using this point of engagement as the place where the lifting force is applied for a fixed distance, this assures that the hole 162 will ultimately be in the same position with respect to the knife 82 as all prior birds and all subsequent birds, regardless of body and leg length. Hence, the danger of overinserting to a depth which would cause the knife 82 to sever the entrails and release their contaminating contents is avoided.

In position III the cutting edge 90 is inclined forwardly with respect to the path of swinging movement 164 (FIG. 11) of the blade 88, and is thus perfectly positioned to begin the slitting stroke through the skin 166 between the hole 162 and the keel bone area 168. Consequently, by the time the bird 160 and its slitting unit 60 have advanced to position IV of FIG. 2 (see also position IV of FIG. 6), the cam follower 114 will have passed point B on track 116 and fallen off the stretch 116a onto the lower stretch 116b, allowing the spring 68 to quickly flip the knife 82 outwardly and upwardly along the path 164 to slit the skin 166. This swinging stroke on the part of the knife 82 may be conveniently referred to as the slitting stroke; and, as is apparent, it is carried out much more rapidly than the cocking stroke during which the follower 118 gradually rides up the sloping cam stretch 116a. As seen in FIG. 12, the knife 82 has returned to its operated position, and yet, during its quick movement to such position, the device 130 has maintained the legs of the bird 160 clamped tightly against the locating elements 154 since the cam track portion 140b between points Y and Z is essentially the same radial distance from the central axis of the pipe 30 all along the length of the portion 140b. Noteworthy is the fact that the point B on cam track 116 controlling knife movement is slightly beyond point Y on the track 140 controlling movement of the device 130. Thus, the slitting stroke of the knife 82 is not begun until the device 130 has reached the upper limit of its clamping movement against the thighs of the bird 160.

Beyond position IV, the cam track 140 allows the spring 142 to return the device 130 to its normal unactuated position against the stops 144, thereby freeing the bird 160 for removal from the apparatus. Note that as the device 130 is returned to its position against stops 144, the weight of the bird 160 is returned to the shackle 46. Inasmuch as the conveyor 40 departs from the apparatus as the device 130 releases the bird 160, the bird 160 is swung away from its unit 60 for further processing as may be necessary or desirable.

Note that as the knife 82 backs along path 164 during its cocking stroke, the cutting edge 90 is not exposed to the skin 166 because the backside of the case 98 leads. Moreover, as the hole 162 intersects and receives the knife 82, it is the rounded lowermost tip of case 98 that enters the hole 162. Thus, the tip is in position to push any organs that it may encounter downwardly and away from the skin 166 and the cutting edge 90 and, in any event, is in position to maintain the cutting edge 90 at a distance from such organs during the ensuing slitting stroke along path 164. Consequently, the risk of puncturing or severing the organs so as to release contaminated fluids is minimized.

We claim:

1. In a method of making an enlarged opening to the body cavity of a bird by inserting a knife into a hole at the stern of the bird and then using the knife to slit the skin between the hole and the keel bone of the bird, the improvement comprising:

clamping only the thighs and legs of the bird against stationary shoulder means at a known relationship to the knife before inserting the latter into the hole of the bird while leaving the remaining trunk portion of the bird otherwise unrestrained; and continuing to maintain the bird clamped only by its thighs and legs throughout the inserting and slitting steps so that the hole of the bird will remain properly positioned during the insertion of the knife, yet the trunk portion of the bird may yield outwardly during the slitting stroke of the knife to thereby avoid damage to the keel bone and excessive slitting of the skin.

2. In a method as claimed in claim 1, wherein the bird is shifted by its thighs to said shoulder means for clamping.

3. In a method as claimed in claim 1, wherein the bird is suspended from overhead means prior to said clamping; and lifting the weight of the bird off said overhead means during said clamping.

4. In a method as claimed in claim 3, and the additional step of conveying the bird along a prescribed course of travel using said overhead means prior to and after said clamping.

5. In a method as claimed in claim 1, and the additional step of conveying the bird along a prescribed course of travel throughout the process of making the enlarged opening.

* * * * *